(12) United States Patent
Pedersen

(10) Patent No.: US 6,176,437 B1
(45) Date of Patent: Jan. 23, 2001

(54) BLAST GUN FOR COMPRESSED AIR

(75) Inventor: Ejnar Pedersen, Esbjerg N (DK)

(73) Assignees: Mona Skannerup; Kristian Skannerup, both of Ulfborg (DK)

( * ) Notice: Under 35 U.S.C. 154(b), the term of this patent shall be extended for 0 days.

(21) Appl. No.: 09/350,298

(22) Filed: Jul. 9, 1999

Related U.S. Application Data

(63) Continuation-in-part of application No. 08/133,009, filed on Oct. 15, 1993, now abandoned.

(51) Int. Cl.[7] .................... B05B 3/02; B05B 5/02; B05B 1/08
(52) U.S. Cl. .............. 239/99; 137/624.14; 239/101; 239/413; 239/526; 239/532; 239/570
(58) Field of Search .............. 239/99, 100, 101, 239/11, 570, 532, 526, 413; 137/624.14

(56) References Cited

U.S. PATENT DOCUMENTS

| | | |
|---|---|---|
| 2,638,381 | 5/1953 | Paxton . |
| 4,077,569 | 3/1978 | Deines . |
| 4,203,464 | 5/1980 | Farrell et al. . |
| 4,895,305 | 1/1990 | Powell . |
| 4,917,351 | 4/1990 | Lindbloom et al. . |
| 4,933,017 | 6/1990 | Brzoska . |
| 5,170,943 | 12/1992 | Artzberger . |

FOREIGN PATENT DOCUMENTS

| | | |
|---|---|---|
| 48686 | 5/1974 | (AU) . |
| 1099769 | 2/1961 | (DE) . |
| 3338197 | 5/1985 | (DE) . |
| 3901933 | 8/1990 | (DE) . |
| 1090294 | 5/1984 | (SU) . |
| 1122494 | 11/1984 | (SU) . |

*Primary Examiner*—Andres Kashnikow
(74) *Attorney, Agent, or Firm*—Dennison, Scheiner, Schultz & Wakeman

(57) ABSTRACT

A dusting gun for removal of dirt and for cleaning purposes, where dirt, dust, oil and other loose or firmly sticking coats are removed with compressed air. The dusting gun comprises an oscillating pressure discharge valve which causes splitting up of the air flow into periodically repeated pressure discharges. The oscillating valve acts automatically under the influence of the static and dynamic pressures of the compressed air and is designed to oscillate with a frequency in the range of 2–50 Hz. The oscillating valve is connected to a nozzle by an elongated air duct.

7 Claims, 2 Drawing Sheets

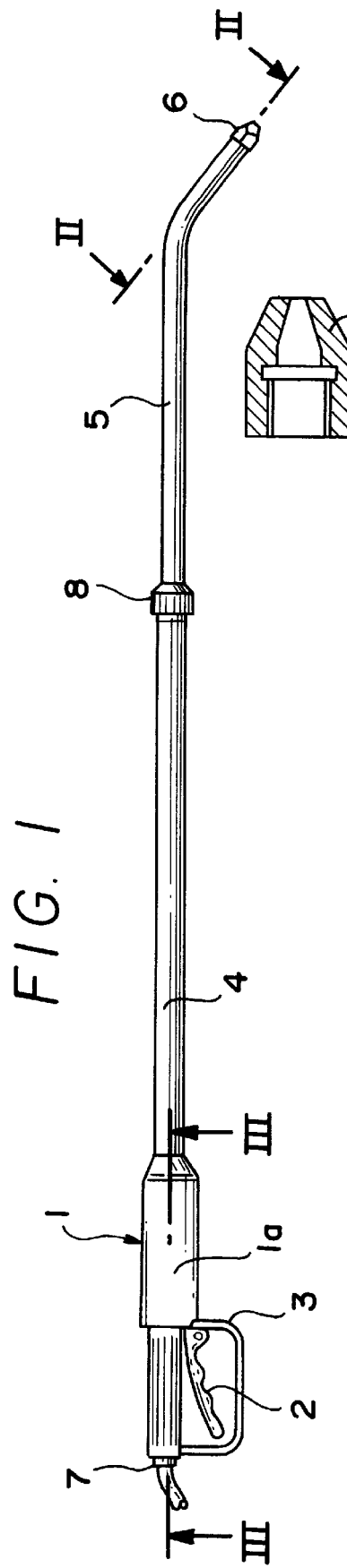
FIG. 1
FIG. 2
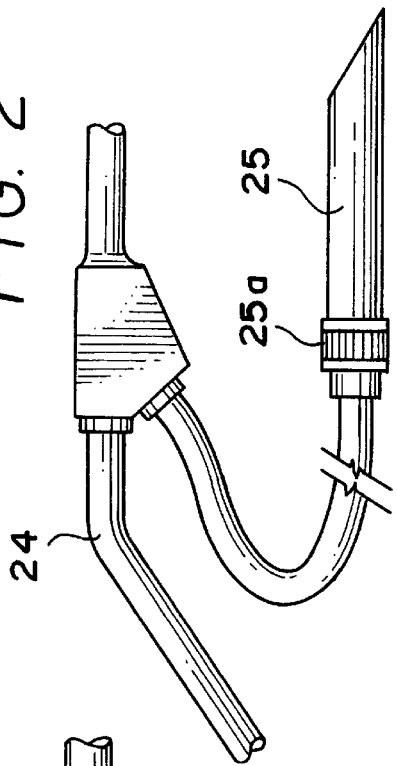
FIG. 4
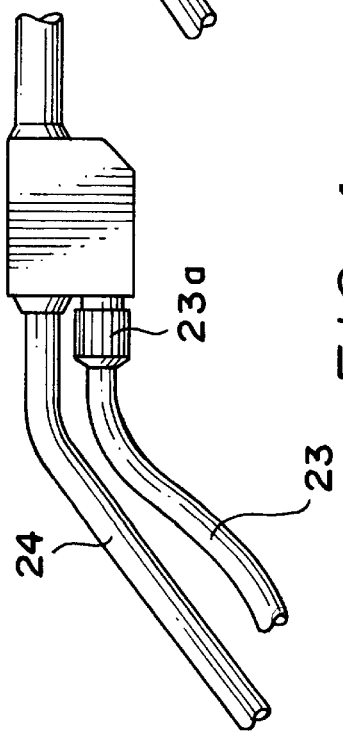
FIG. 5

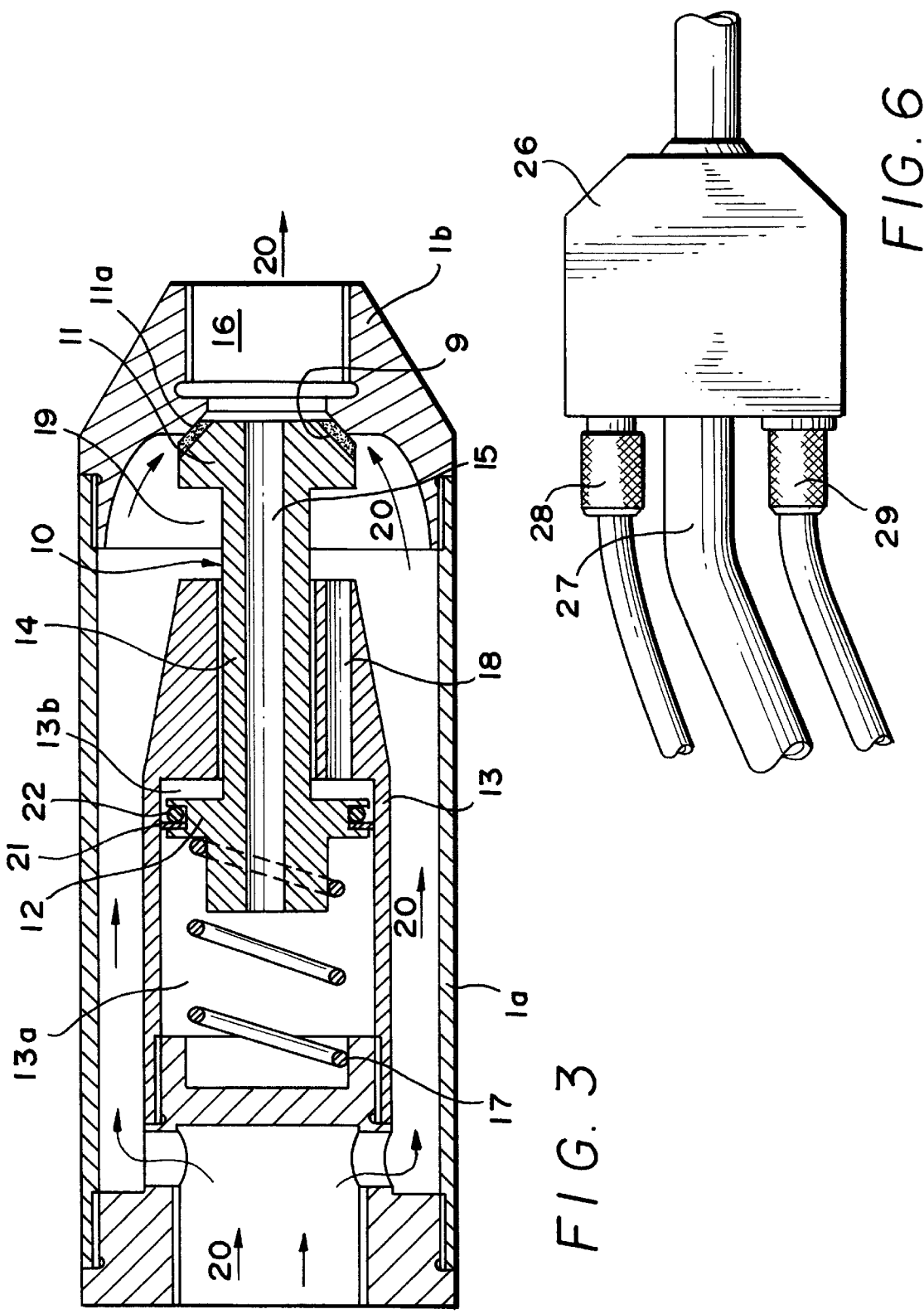

BLAST GUN FOR COMPRESSED AIR

This application is a continuation-in-part of application Ser. No. 08/133,009, filed Oct. 15, 1993, now abandoned.

BACKGROUND OF THE INVENTION

The present invention relates to a compressed air dusting gun and more specifically, to a gun which includes a pressure discharge valve oscillating within a predetermined frequency range.

The application of compressed air for removal of dirt and cleaning purposes is a well known and extensively used technique. In order to produce a concentrated and controllable air jet, the usual design includes a pistol-like tool equipped with an oblong air nozzle and a built-in shut-off valve. The shut-off valve is manually operated via a pawl or similar trigger mechanism mounted in connection with the handle of the dusting gun. When the trigger mechanism is activated, a concentrated air jet is discharged through the nozzle and by pointing this air jet on the object to be cleaned, it is possible to loosen and blast off foreign matter, such as dust, earth, oily coats. The ability of the air jet to loosen old dirt and adherent coatings of various kinds depends on the dynamic pressure exerted by the jet, i.e. primarily the jet velocity. The greater the velocity, the better the cleaning effect.

However, the jet velocity is limited to the available air pressure source, usually on the order of 6 bar, and consequently, an increase in the cleaning effect can only be achieved by increasing the air flow. Especially for the purpose of removal of adherent thick accumulations, the air consumption may easily be disproportionately large and the cleaning method therefore uneconomical.

DE Publication No. 1,099,760 (Odendahl) describes a known dusting gun for compressed air which consists of a valve designed with a longitudinally displaceable oblong valve body whose one end is in sealing contact against a valve seat shutting off the air flow through the gun under the influence of a compression spring, and whose other end is embodied as a piston, which is displaceably inserted into a closed cylinder. One side of the piston is in contact with the air duct in the dusting gun downstream of the valve via a longitudinal bore through the valve body and whose other side is in connection with the pressure side upstream of the valve through an adjustable regulator. The inlet to and the outlet from the dusting gun are shaped as a Laval nozzle. The regulator may be adjusted so that the movement of the piston is in resonance with the natural frequency of the pressure column in the system.

This known dusting gun is complicated in its construction. It is difficult to adjust and the velocity of the air is oscillating in a region from somewhat below to somewhat above the Mach region.

SUMMARY OF THE INVENTION

It is a purpose of the present invention to describe a blast gun for compressed air without the drawbacks of known prior art which is simple in construction and which has a high cleaning effect and high efficiency. According to the invention, this is achieved by designing the dusting gun as described and claimed hereinafter.

The dusting gun of the invention employs an oscillating shut-off valve with the effect that the compressed air, instead of being ejected as a continuous air jet through the nozzle, is divided into a series of short pressure pulses, more specifically, a pulsating air stream with periodically repeated pressurized discharges. These periodical pressure discharges, by way of example with frequencies in the range of 2–50 Hz, involve a time related concentration of the pressure energy of the air so that the peak value of the dynamic pressure of the air in each individual pulse is increased as compared to the dynamic pressure that would be achieved if the same volume of air is ejected continuously through a nozzle. The dynamic pressure in the air jet determines the ability of the air to loosen adherent accumulations from the surface to be cleaned.

In addition to the greater dynamic pressure, it has been discovered that the pulsating air jet also has the effect of setting the impurities in vibrating motion under the influence of the air pulses. In the case of certain types of impurities and coats, practice has shown that this effect contributes to increasing the cleaning action of the dusting gun as the vibrations cooperate in loosening the substances so that the cleaning operation is much faster, more thorough, and more economical with regard to the consumption of compressed air. The dusting gun according to the invention is therefore able to replace traditional high pressure continuous flow cleaning or water-based jet cleaning, with the advantages this entails, both with regard to economy and environmental protection.

According to the invention, the piston seal is made of Teflon® brand PTFE or a similar material and further in accord with this design, the sealing arrangement satisfies the demand for low friction and ease of valve actuation. An expedient measure is the manufacture of the valve seat or the valve body itself with a rubber or other elastic coating, such as polyurethane or synthetic rubber, with a view to reduce noise level and to assure long life of the valve.

The dusting gun, according to the invention, can, like any ordinary compressed air dusting gun, be combined with an ejector for the supply of liquid or granular material together with the air. The combination of pulsating compressed air and an additive consisting of a granular agent for cleaning or a liquid cleaning solution provides a significant increase in the cleaning result. This option is proposed for special cases where a significant increase in cleaning efficiency is demanded.

BRIEF DESCRIPTION OF THE DRAWINGS

FIG. 1 is a side elevational view of a compressed air dusting gun according to the invention;

FIG. 2 is an enlarged cross-sectional view of a jet nozzle of the dusting gun taken along the lines II—II of FIG. 1;

FIG. 3 is an enlarged longitudinal cross-sectional view of the oscillatory shut-off valve of the dusting gun taken along the lines III—III of FIG. 1;

FIG. 4 illustrates a modification of the invention with a nozzle pipe for use with the addition of a liquid simultaneously supplied with the compressed air;

FIG. 5 illustrates a further modification of the invention with a nozzle pipe intended for sand blasting;

FIG. 6 is a side elevational view of a nozzle pipe with accommodations for two different liquids supplied simultaneously with the compressed air.

DETAILED DESCRIPTION OF THE INVENTION

In the embodiment shown in the drawing FIG. 1, the dusting gun consists essentially of a handle section 1 in the form of a pistol grip with a trigger lever 2 and trigger guard 3, an extension barrel 4, and an exchangeable nozzle pipe 5. The cross-section of the nozzle pipe has an exchangeable nozzle bit 6. The nozzle bit is shown separately in FIG. 2. The handle section 1 extends in a longitudinal direction and contains a shut-off valve, not shown in detail, which is opened by operating the trigger lever 2, and an oscillatory pressure discharge valve. The pressure discharge valve is built into the portion of the handle section 1a. The air connection to the dusting gun takes place through a coupling 7. The nozzle pipe 5 is mounted on the extension barrel 4 by means of a knurled pipe union nut 8.

FIG. 3 is a cross-sectional view of the oscillatory pressure discharge valve showing the structure in detail. The components of the pressure discharge valve are the portions of handle section 1a, forming a cylindrical housing and a seat portion 1b, valve stem having a seat 9, at one end of valve body 10. The valve body is embodied in the shape of an oblong, rotationally symmetric body portion extending in a longitudinal direction. The forward end of the valve body is formed as a cone-shaped part 11 with a tight fit against the seat 9. A rubber coating 11a is vulcanized onto the cone-shaped part 11. The opposite end of the valve body 10 includes a piston 12 which is mounted in cylinder 13. Between the piston 12 and the cone-shaped part 11, the valve body consists of an oblong cylindrical shaft portion 14.

A longitudinal bore in the valve body 15 serves to connect the portion 13a of cylinder 13 to an air duct 16 having a generally cylindrical cross-section and thus to the extension barrel 4 and the nozzle pipe 5. The valve body is held close in its seat by a compression spring coil 17 inserted in the cylinder 13 behind the piston 12 and a rear portion of the cylinder.

The portion 13b of the cylinder in front of piston 12 is connected via an eccentrically positioned longitudinal bore 18 to an air chamber 19 which is located behind the valve stem and thus on the pressure side. The direction of flow through the shut-off valve is shown with arrows 20.

The piston 12 of the valve body is fitted with a low-friction sealing ring composed of a Teflon® brand PTFE disk 21 and an O-ring 22. The O-ring serves as a supporting disk for the Teflone® ring which, through its contact against the cylinder wall, ensures a tight fit of the piston. Valve dimension, size and weight of the valve body, spring characteristics, the flow duct's cross-sectional area, etc. are configured so that the desired oscillatory effect is self generated immediately on the opening of the air flow, i.e. by activation of the trigger lever 2.

The mode of operation of the oscillating shut-off valve is as follows. In the normal starting position, the valve body is held against the valve seat in its closed sealing position by the coil spring 17. When compressed air is admitted, the pressure is increased on one side of the piston and when the pressure exceeds the spring force, the valve opens which results in a momentary discharge of compressed air and a drop in the pressure. The valve closes again under the influence of the spring 17 and the cycle is repeated. Oscillation continues as long as compressed air is admitted to the valve. The valve thus causes an automatic alternating opening and closing, under the influence of the static and dynamic pressures of the compressed air, of the passage of air in the dusting gun.

The oscillation action of the valve body presupposes a suitable balanced condition between the valve dimension, the mass of the valve body (the moving mass) and the characteristics of the spring. It is also essential that the valve body move freely, i.e. with low friction. The oscillation frequency depends on these factors in combination with the pressure of the compressed air. Frequencies in the range of 2–50 Hz have been tested and found effective for cleaning applications.

During the oscillatory motion of the valve body, the passage of the compressed air through the valve seat is opened and closed and this gives rise to the desired air pulses with cyclically repeated pressure discharges. The pressure impacts from the pressure discharges are transmitted through the valve seat and through the extension barrel 4, the nozzle pipe 5, and the nozzle 6.

By exchanging the nozzle pipe 5, the dusting gun can be fitted with ejectors of various kinds. FIG. 4 shows a conventional device for combining a mixture of air and liquid. The liquid is supplied via a hose 23. The nozzle pipe of the dusting gun is designated 24.

The device for combining the moisture alternatively serve as a means for drawing from a supply of liquid by suction. The liquid will then be drawn into the device from a reservoir (not shown) by normal vacuum effect when compressed air is directed through the nozzle.

Thus, it is contemplated that the volume of liquid, for example, water, is adjustable from a minimum (zero) and upwards to a predetermined maximum in such a way that the ejector can preferably function by the injector effect proper, i.e. self-priming, and alternatively, by a supply of liquid at a positive pressure which is generated by a pump or a pressurized reservoir.

Both as a device for combining and as an ejector, the quantity of liquid is adjustable by means of a flow restriction valve positioned at the intake opening of the ejector nozzle. The flow restriction valve is operated via a finger union nut 23a.

FIG. 5 illustrates an ejector for use in sand blasting. The sand is drawn into the nozzle by the ejector through a tubular lance 25. By regulation of the suction air through the suction hose, the flow of sand can be regulated to meet actual needs. Regulation is done by means of an air flow valve (volume regulation valve) 25a built into the upper end of the sand supply lance 25.

FIG. 6 depicts in side elevation a device 26 which, in addition to an air admission conduit 27, has two additional connectors 28 and 29 for admixture of water and liquid chemicals, respectively. This design makes it possible to mix air, water and chemicals, as needed. This combination is useful in connection with jobs requiring disinfection or the addition of solvents for cleaning grease.

The device 26 can be used in the following combinations:
1) air only (both liquid intakes are plugged or otherwise closed),
2) air and adjustable volume of water,
3) air and adjustable volume of water and adjustable volume of chemicals,
4) air and adjustable volume of chemicals,
5) air and water soluble chemical and adjustable chemical,
6) air drying after cleaning with water/chemicals.

Further, the ejector may include a built-in control valve for the liquid designed for activation, i.e. opening, under the influence of the air pressure in the ejector and nozzle, when the dusting gun is activated by pressing on the trigger.

A series of tests have been carried out with the blast gun according to the invention.

Upstream the blast gun 1 and upstream the nozzle 6 manometers, A and B respectively, for measuring the static pressures were connected. Further, the air consumption was measured.

The tests were carried out with different lengths of the extension barrel 4, with a 6 mm diameter nozzle, with a 10 mm diameter nozzle, and without a nozzle.

On the following page, Exhibit A, shows the results from one of the tests. The cleaning effects are calculated as the kinetic energy, $½ mv^2$, of the air at the nozzle 6.

EXHIBIT A

| Access pressure A $p_1$ bar | pressure B $p_2$ bar | Air consumption m³/min. | Cleaning effect KW |
|---|---|---|---|
| a. Length of barrel 4: 100 cm  Diameter - - 4: ⅜"  Diameter - nozzle 6: 6 mm. | | | |
| 6.0 | 2.48 | 1.20 | 2.41 |
| 7.0 | 3.32 | 1.49 | 6.36 |
| 8.0 | 4.34 | 1.80 | 14.72 |
| b. Length of barrel 4: 100 cm  Diameter - - 4: ⅜"  Diameter - nozzle 6: 10 mm. | | | |
| 4.9 | 1.13 | 1.99 | 5.10 |
| c. Length of barrel 4: 100 cm  Diameter - - 4: ⅜"  Nozzle removed. | | | |
| 4.0 | 0 | 1.89 | ≈0 |

The invention is not limited to the above shown and described embodiment. Other types of oscillatory pressure discharge valves are also possible. The primary purpose of the invention is the conversion of the static energy of the compressed air into a pulsating, concentrated air jet with high dynamic energy content in each of the individual pressure discharges.

It is clear from the tests that the cleaning effect for a selected nozzle is increased with increasing air pressure.

Further, it appears from the test that the size of the nozzle must be proportional to the volume of air.

It also appears from the test that if an air flow restriction, such as a nozzle, is not used, there is no cleaning effect.

The test in which no nozzle was used was carried out while the blast gun was working. If the blast gun is stopped and the nozzle removed, it is not possible to start the blast gun. That is probably one of the reasons why an adjusting valve 22–24 has to be installed in the prior art (Odendahl) blast gun.

Compared with the prior art blast gun, the blast gun according to the instant invention is simpler in its construction and is easier to operate.

The improved benefits are notably:
1. High cleaning effect.
2. High efficiency.
3. It is sturdy and dependable and easy to operate.
4. It is simple in construction and therefore inexpensive to manufacture.
5. Extension barrels of a length of 250 cm or more may be used without the cleaning effect being substantially reduced.

What is claimed is:

1. Dusting gun for operation with compressed air in which the dynamic effect of air pulses is utilized for the removal of foreign matter, said dusting gun comprising:
    a handle section (1) with a trigger lever (2), and trigger guard (3), an extension barrel (4) connected to the handle section, an exchangeable nozzle pipe (5) connected to the extension barrel, and an exchangeable nozzle bit (6) at the end of the nozzle pipe;
    an oscillating shut-off valve built into the handle section, said oscillating shut-off valve having an inlet for compressed air, a valve seat (9) and an outlet air duct (16);
    a cylinder (13) formed within said shut-off valve, an oblong valve body (10) longitudinally displaceable within said cylinder, said valve body having one end forming a cone shaped disc (11) in sealing contact against the valve seat (9) for shutting off the compressed air flow through the dusting gun under the influence of a compression spring (17), and the other end of the valve body forming a piston (12) movable within said cylinder;
    a first longitudinal bore (15) through said valve body for providing a pressure connection between a rear portion (13*a*) of said cylinder and said extension barrel through the outlet air duct;
    a second longitudinal bore (18) for providing a permanently open connection between a front portion (13*b*) of the cylinder and an air chamber (19) into which compressed air is fed when operating the trigger lever;
    wherein the size and weight of the cone shaped disc (11), the piston (12), a friction between the piston (12) and the cylinder (13), the first and second bore cross-sectional area, and the spring characteristic of the compression spring (17) are configured to cooperate with the air flow resistance caused by the nozzle (6) at the end of the nozzle pipe (5) so that when the trigger lever (2) is operated, the shut-off valve acts under the influence of the compressed air which is imparted, to oscillate with a frequency of about 2–50 Hz causing the generation of air pulses by the valve opening and closing the air flow.

2. The dusting gun according to claim 1 wherein the piston (12) includes a ring-shaped groove which is furnished with a low-friction Teflon® brand PTFE sealing ring which has good sliding properties.

3. The dusting gun according to claim 2 wherein the low-friction sealing ring is composed of a thin Teflon® brand PTFE ring (21) supported on one side by an O-ring (22), and by both rings being embedded in a ring-shaped groove in the piston.

4. The dusting gun according to claim 1, wherein said cone-shaped disc (11) is coated with a rubber-like elastic material (11*a*) with good fatigue strength.

5. The dusting gun according to claim 1, wherein said cone-shaped disc (11) is coated with one of polyurethane and synthetic rubber.

6. A dusting gun for compressed air in which the dynamic effect of a pulsed air jet is utilized for the removal of dirt and for cleaning purposes, in which dirt, dust, oil and other loose or sticking coats are removed with air jets in combination with at least one other cleaning agent added to each air jet immediately before it is directed against the object to be cleaned, said dusting gun comprising:
    a handle section (1) with a trigger lever (2), trigger guard (3), an extension barrel (4), a nozzle pipe (24) including a device (26) for addition of at least one cleaning agent, said nozzle pipe (24) providing resistance to flow;
    said handle section extends in a longitudinal direction with an inlet for compressed air, an outlet forming a valve seat (9) extending into an air duct (16) of cylindrical cross-section to which the extension barrel (4) is connected;
    an oscillator shut-off valve built into the handle section including a cylinder (13), a valve body (10) displaceable in the longitudinal direction, said valve body having a shaft portion (10), a rearward end forming piston (12), a forward end forming a cone shaped disc (11); and a compression spring (17) for pressing the piston and thus the cone shaped disc forward into sealing contact with said valve seat (9) for shutting off air flow;

said valve body (10) including a longitudinal bore (18) for uninterruptedly conducting compressed air into cylinder front portion (13*b*) so as to move the valve body rearward against the compression spring, and a bore (15) through said valve body to generate a pressure connection between a cylinder rear portion (13*a*) to said extension barrel through the air duct; the size and weight of the valve body (10) and the piston (12), the friction between the piston (12) and the cylinder (13), the bore and the duct cross-sectional area, the characteristic of the spring (17) the flow resistance generated by the nozzle (6) being determined so that when the trigger lever (2) is operated, the shut-off valve under the influence of the compressed air pressure which is imparted, generates pulses with a frequency of about 2–50 Hz by causing the valve alternately to open and close the air flow, and wherein said device (26) operates to add said at least one cleaning agent to the pulsed air jet.

7. The dusting gun according to claim 1, wherein said cone-shaped disc (11) is coated with polyurethane or synthetic rubber.

* * * * *